US011025357B1

(12) United States Patent
Sayed et al.

(10) Patent No.: US 11,025,357 B1
(45) Date of Patent: Jun. 1, 2021

(54) ROBUST SENSOR TIMESTAMP MANAGEMENT

(71) Applicant: STMicroelectronics, Inc., Coppell, TX (US)

(72) Inventors: Karimuddin Sayed, Fremont, CA (US); Ashish Bhargava, San Jose, CA (US); Chandandeep Singh Pabla, Fremont, CA (US); Mahesh Chowdhary, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 16/721,331

(22) Filed: Dec. 19, 2019

(51) Int. Cl.
*H04J 3/06* (2006.01)
*G06F 9/54* (2006.01)
(Continued)

(52) U.S. Cl.
CPC .......... *H04J 3/0661* (2013.01); *G06F 9/4812* (2013.01); *G06F 9/542* (2013.01);
(Continued)

(58) Field of Classification Search
CPC ...... G06F 3/0416; G06F 3/04164; G06F 9/48; G06F 9/4837; G06F 9/542; G06F 9/546;
(Continued)

(56) References Cited

U.S. PATENT DOCUMENTS 4,426,624 A 1/1984 Beaducel et al.
7,085,681 B1 * 8/2006 Williams ............ G06F 11/0724
702/183

(Continued)

FOREIGN PATENT DOCUMENTS

EP 3 043 478 A1 7/2016
WO 2004/099801 A1 11/2004
WO 2017/070593 A2 4/2017

OTHER PUBLICATIONS

Brahmi et al., "Timestamping and Latency Analysis for Multi-Sensor Perception Systems," 2013 IEEE Sensors, Baltimore, MD, Nov. 3-6, 2013, 5 pages.

*Primary Examiner* — Thomas J. Cleary
(74) *Attorney, Agent, or Firm* — Seed Intellectual Property Law Group LLP

(57) ABSTRACT

Systems, methods and devices are provided to improve management and accuracy of timestamps associated with sensor-based data. An indication is received of a sensor event associated with data samples provided from a sensor having an output data rate. A respective timestamp is assigned to each of the data samples. Assigning the respective timestamp may include, responsive to a determination that the indicated event is an interrupt event, calculating an actual data sampling interval based at least in part on time intervals between previous sensor events and a on a quantity of the one or more data samples. Assigning the respective timestamp may alternatively include, responsive to a determination that the event type is a data flush event, assigning the respective timestamp based on an actual data sampling interval associated with one or more previous sensor events if the actual data sampling interval has been previously stored, and otherwise assigning the respective timestamp based at least in part on the output data rate. Correction logic and drift compensation may be applied to the assigned respective timestamps.

21 Claims, 6 Drawing Sheets

(51) Int. Cl.
*G06F 11/30* (2006.01)
*G06F 11/07* (2006.01)
*G06F 13/32* (2006.01)
*G06F 9/48* (2006.01)

(52) U.S. Cl.
CPC ............ *G06F 9/546* (2013.01); *G06F 11/076* (2013.01); *G06F 11/3013* (2013.01); *G06F 13/32* (2013.01); *G06F 9/4837* (2013.01); *G06F 11/0757* (2013.01); *G06F 2201/835* (2013.01); *G06F 2211/004* (2013.01); *G06F 2213/2424* (2013.01)

(58) Field of Classification Search
CPC ............... G06F 11/0757; G06F 11/067; G06F 11/1687; G06F 11/3013; G06F 13/24; G06F 13/32; G06F 2201/835; G06F 2211/004; G06F 2213/2424; G06F 11/167; H04J 3/0661; H04J 3/067
See application file for complete search history.

(56) References Cited

U.S. PATENT DOCUMENTS

| | | | |
|---|---|---|---|
| 7,551,647 | B2 | 6/2009 | Fellman et al. |
| 8,843,684 | B2 | 9/2014 | Jones et al. |
| 9,939,838 | B1* | 4/2018 | Gao .......................... G06F 1/04 |
| 2015/0281809 | A1* | 10/2015 | Foster, III ................ H04Q 9/00 340/870.26 |
| 2016/0323565 | A1* | 11/2016 | van Baarsen ........ H04N 13/271 |
| 2018/0091290 | A1 | 3/2018 | Li |
| 2018/0224887 | A1* | 8/2018 | Pitigoi-Aron ........... G06F 13/24 |
| 2019/0020433 | A1* | 1/2019 | Pitigoi-Aron ............. G06F 1/12 |
| 2019/0331493 | A1* | 10/2019 | Bellusci ................. G01P 15/18 |

* cited by examiner

ROBUST SENSOR TIMESTAMP MANAGEMENT

BACKGROUND

Technical Field

The present disclosure generally relates to sensor-based timestamp correction and management. More particularly, but not exclusively, the present disclosure relates to the generation or correction of timestamps associated with sensor data.

Description of the Related Art

In various devices and applications, data received from multiple sensors (e.g., accelerometer, gyroscope, magnetometer, radar, time-of-flight, photographic or videographic, and others) may be combined in order to enable accurate operation. For example, mobile devices and other devices may include image stabilization subsystems (e.g., Optical Image Stabilization or Electronic Image Stabilization) that utilize synchronized data from multiple sensors, as do augmented- and virtual-reality systems and applications.

BRIEF SUMMARY

Disparities in timestamp information associated with sensor data—such as that introduced by inaccuracy, latency, or jitter—may interfere operation or accuracy of devices utilizing such sensor data.

There is, therefore, a need to increase or ensure the accuracy of timestamps associated with sensor data in order to enable a variety of multi-sensor systems.

Techniques described herein are generally directed to improving timestamp management and accuracy for scenarios in which a hardware interrupt event timestamp is available (in which the interrupt event timestamp may be used as a basis for data sample timestamp management), as well as those in which no such hardware interrupt event timestamp is provided (such as a data flush event). Such described techniques generally improve timestamp management for sensor-based sample data by one or more of: calculating or maintaining a reliable actual sampling interval; applying timestamp correction logic to timestamps associated with particular sensor-provided data samples; and adjusting timestamps to compensate for drift, thereby limiting latency issues. In an embodiment, a method may comprise receiving an indication of a sensor event associated with one or more data samples provided from a sensor having an output data rate; determining an event type of the indicated event; assigning a respective timestamp to each of the one or more data samples; and providing the one or more data samples with the one or more respective timestamps. Assigning the respective timestamp may include, responsive to a determination that the event type is an interrupt event, calculating an actual data sampling interval based at least in part on one or more time intervals between two or more previous sensor events and a on a quantity of the one or more data samples. Assigning the respective timestamp may alternatively include, responsive to a determination that the event type is a data flush event, assigning the respective timestamp based on an actual data sampling interval associated with one or more previous sensor events if the actual data sampling interval has been previously stored, and otherwise assigning the respective timestamp based at least in part on the output data rate.

In an embodiment, a system may comprise processing circuitry, a sensor communicatively coupled to the processing circuitry to provide sensor data, and timestamp correction circuitry communicatively coupled to the processing circuitry to perform automated operations for managing timestamp information regarding the sensor data. The automated operations may include to receive an indication of a sensor event associated with one or more data samples provided from the sensor; to assign a respective timestamp to each of the one or more data samples; and to provide the one or more data samples with the one or more respective timestamps. To assign the respective timestamp may include, responsive to a determination that the indicated event is an interrupt event, calculate an actual data sampling interval based at least in part on one or more time intervals between two or more previous sensor events and a on a quantity of the one or more data samples; or, responsive to a determination that the indicated event is a data flush event, to assign the respective timestamp based on an actual data sampling interval associated with one or more previous sensor events if the actual data sampling interval has been previously stored, and otherwise to assign the respective timestamp based at least in part on an output data rate associated with the sensor.

In an embodiment, a non-transitory computer-readable medium may have stored instructions thereon that, when executed by one or more processors, cause the one or more processors to perform one or more automated operations. The automated operations may comprise receiving an indication of a sensor event associated with one or more data samples provided from a sensor having an output data rate; assigning a respective timestamp to each of the one or more data samples; and providing the one or more data samples with the one or more respective timestamps. The assigning of the respective timestamp may include, responsive to a determination that the indicated event is an interrupt event, calculating an actual data sampling interval based at least in part on one or more time intervals between two or more previous sensor events and a on a quantity of the one or more data samples; or, responsive to a determination that the indicated event is a data flush event, assigning the respective timestamp based on an actual data sampling interval associated with one or more previous sensor events if the actual data sampling interval has been previously stored, and otherwise assigning the respective timestamp based at least in part on the output data rate.

DETAILED DESCRIPTION

Figure 1:
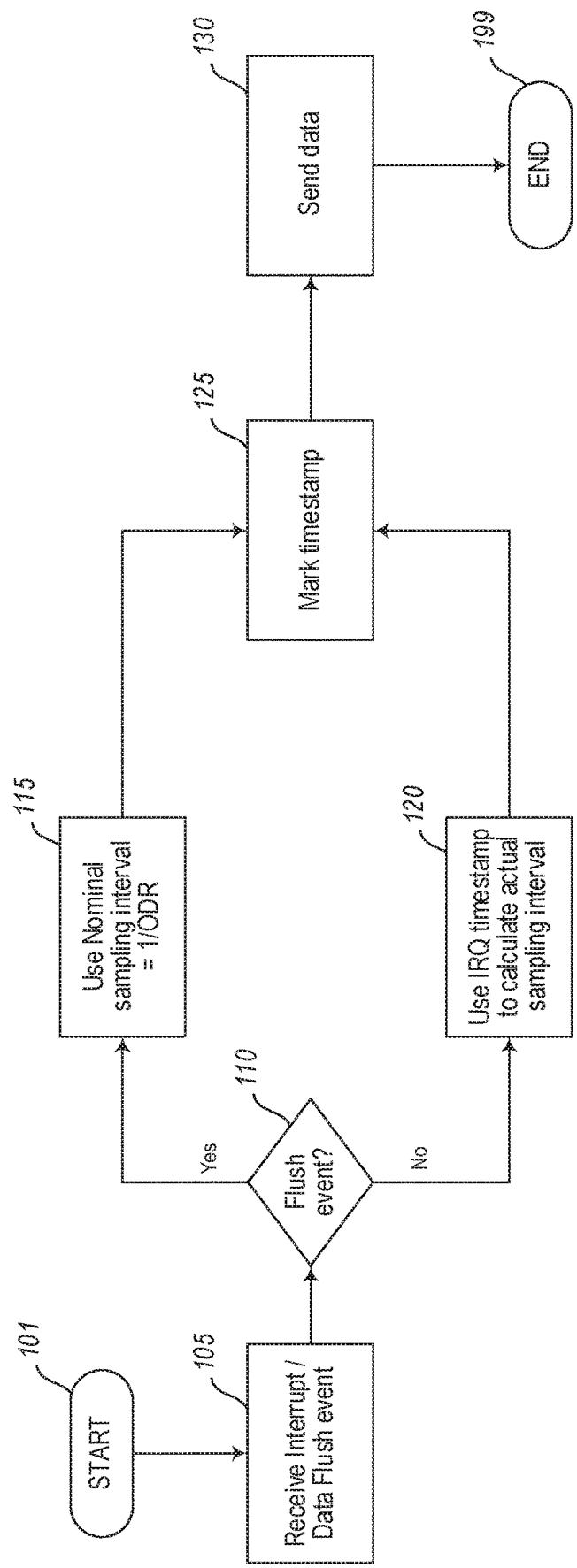
FIG. 1 graphically depicts an exemplary operational routine for timestamp management in accordance with comparative exemplary solutions.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, integrated circuits, logic gates, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

As used herein, a sensor interrupt event (interchangeably used with "interrupt event") refers to an indication from a sensor that is generating sensor data, or otherwise associated with such data, that a required or expected quantity of data (such as a defined quantity of data samples) is available. In contrast, a sensor flush event (interchangeably used herein with "data flush event" or "flush event") refers to a request for sensor data (such as a request issued by a user or application) that is received prior to such sensor data being available via an interrupt event. Also as used herein, an interrupt request timestamp (or "IRQ timestamp") refers to information indicating a precise time at which a sensor interrupt event occurred.

As used herein, a "sampling interval" refers to a time difference between two consecutive data samples. Unless contextual use herein clearly indicates otherwise, a "nominal sampling interval" generally refers to a stated or target sampling interval, while an "actual sampling interval" generally refers to a sampling interval derived from actual timestamp data associated with the one or more relevant data samples. An "output data rate" or "ODR" refers to a rate at which a sensor is generating data, typically expressed in samples per second or other metric.

A comparative exemplary technique for timestamp management is provided in FIG. 1. In particular, a routine 101 for timestamp management begins at block 105, in which a processor-based system receives an indication of either a sensor interrupt event or a data flush event associated with a sensor that is either integrated with or otherwise communicatively coupled to the processor-based system. At block 110, the processor-based device determines whether the indicated event is a sensor flush event.

If the indicated event is a sensor flush event, no IRQ timestamp is available; the processor-based device proceeds to block 115, in which it determines to use a nominal sampling interval. The nominal sampling interval is based on the output data rate ("ODR") of the associated sensor, and may typically be expressed as 1/ODR, the inverse of that output data rate. As an example, assume that the associated sensor is to provide 100 data samples every 10 seconds, resulting in an ODR equal to 10 samples/sec. The nominal sampling interval is therefore 0.1 seconds, indicating that 0.1 seconds occur between each provided data sample.

If it is determined in block 110 that the indicated event is a sensor interrupt event rather than a sensor flush event, the processor-based device proceeds to block 120, in which the processor-based device determines to use the IRQ timestamp associated with the sensor interrupt event to calculate the actual sampling interval. In contrast to the preceding example involving a nominal sampling interval, suppose that the sensor interrupt event occurs once 100 data samples are available from the indicated sensor, but that the associated IRQ timestamp indicates that 10.5 seconds have elapsed since the preceding IRQ timestamp. Rather than the nominal sampling interval indicated above, the processor-based device calculates the actual sampling interval as 10.5 seconds/100 samples=0.105 seconds.

After either block 115 (in which the nominal sampling interval is selected for use) or block 120 (in which the actual sampling interval is calculated), the processor-based device proceeds to block 125 and associates a timestamp based on the sampling interval with the data provided by the sensor at the time of the indicated event (a flush event or interrupt event, respectively). It will be appreciated that in typical scenarios, the sensor may only associate a timestamp with the flush/interrupt event itself, rather than providing a respective timestamp for each of multiple data samples in a corresponding sample batch. The processor-based device then proceeds to block 130, and sends the data to the relevant component, module, or application that has requested to be provided with data from the indicated sensor. The timestamp management routine then ends at block 199.

Timestamp management solutions such as those described above with respect to the comparative example of FIG. 1 generally suffer from three types of issues. First, timestamp latency, which may be generally described as a delay between a sensor timestamp and system time, may be relatively large and unpredictable. Timestamp latency may be measured in terms of its magnitude (the quantitative difference between a system time and a single sensor timestamp) as well as its duration (the time required for such latency to become close to zero). Second, timestamp accuracy may be insufficient for the accurate fusion of multi-sensor data, such as the fusion of image data from a photographic sensor with motion data from an accelerometer utilized for applications such as optical image stabilization ("OIS"), electronic image stabilization ("EIS"), augmented reality ("AR"), virtual reality ("VR"), or other applications. Third, timestamp jitter (which may be generally described as an unexpected change in sampling interval) may introduce significant inaccuracies into individual timestamps. Jitter may typically be introduced by an external digital signal processor capturing an incorrect interrupt occurrence time, or by a sample being read during a flush event. In certain scenarios, any or all of these issues may result in timestamp drift, in which the inaccuracy of data-associated timestamps progressively increases over time. In addition, certain inaccuracies in timestamp management (such as if a gap between two timestamps associated with two consecutive data samples exceeds ±2% of an expected value) may result in a violation of one or more performance criteria delineated by platform and operating system (OS) developers.

Techniques described herein are generally directed to improving timestamp management and accuracy for scenarios in which a hardware interrupt event timestamp is available (in which the interrupt event timestamp may be used as a basis for data sample timestamp management), as well as those in which no such hardware interrupt event timestamp is provided (such as a data flush event). Such described techniques generally improve timestamp management for sensor-based sample data by one or more of: calculating or maintaining a reliable actual sampling interval; applying timestamp correction logic to timestamps associated with particular sensor-provided data samples; and adjusting timestamps to compensate for drift, thereby limiting latency issues.

In certain embodiments, systems and methods provided in accordance with the techniques described herein may include operations to calculate or maintain one or more of multiple types of sampling intervals for use in sensor-based timestamp management. An accurate actual sampling interval may be calculated based on reliable hardware interrupt information, and stored for use while configuration parameters for the relevant sensor remain unchanged. An accurate nominal sampling interval may be calculated and stored for use while a relevant device (such as a device that incorporates or is communicatively coupled to the relevant sensor) remains powered, and as one non-limiting example may be used when a calculated actual sampling interval is unavailable (e.g., when a reported interrupt interval is deemed unreliable, or when a data flush event occurs).

In various embodiments, systems and methods provided in accordance with the techniques described herein may include operations to apply timestamp correction logic in order to reduce latency and improve timestamp accuracy, as well as to avoid the introduction of timestamp jitter. As one example, if a timestamp associated with an interrupt event differs by an amount greater than a defined portion of the relevant sampling interval from a timestamp associated with the most recent data sample in a corresponding batch of such data samples (for example, if the actual timestamp drift is greater than 2% of the sampling interval), correction logic may be applied to correct the timestamp by an amount equal to that defined portion. Alternatively, if the actual timestamp drift is less than the defined portion of the relevant sampling interval, the correction logic may be applied by modifying the timestamp associated with the most recent data sample to match that of the corresponding interrupt event. In this manner, the correction logic may reduce or eliminate latency that would otherwise accumulate over multiple data samples.

In at least some embodiments, systems and methods provided in accordance with the techniques described herein may include operations for adjusting timestamps to lessen or eliminate timestamp drift, such as in response to a detected change in sensor configuration parameters or device configuration parameters. As one example, when the output data rate associated with a sensor changes (such as due to a modification of sensor/device configuration parameters), such a change may introduce a gap between timestamps of two consecutive data samples that is not aligned to either the old ODR value or the new ODR value. Such a gap may introduce jitter as well as latency. In certain embodiments, such a gap may be eliminated by generating additional data samples with properly aligned timestamps in order to accommodate the appropriate sampling interval. For example, in an embodiment multiple data samples may be inserted in a sensor-based data stream until the timestamp drift is less than a single sampling interval. Such a solution may eliminate jitter and may limit a maximum latency to that single sampling interval.

Figure 2:
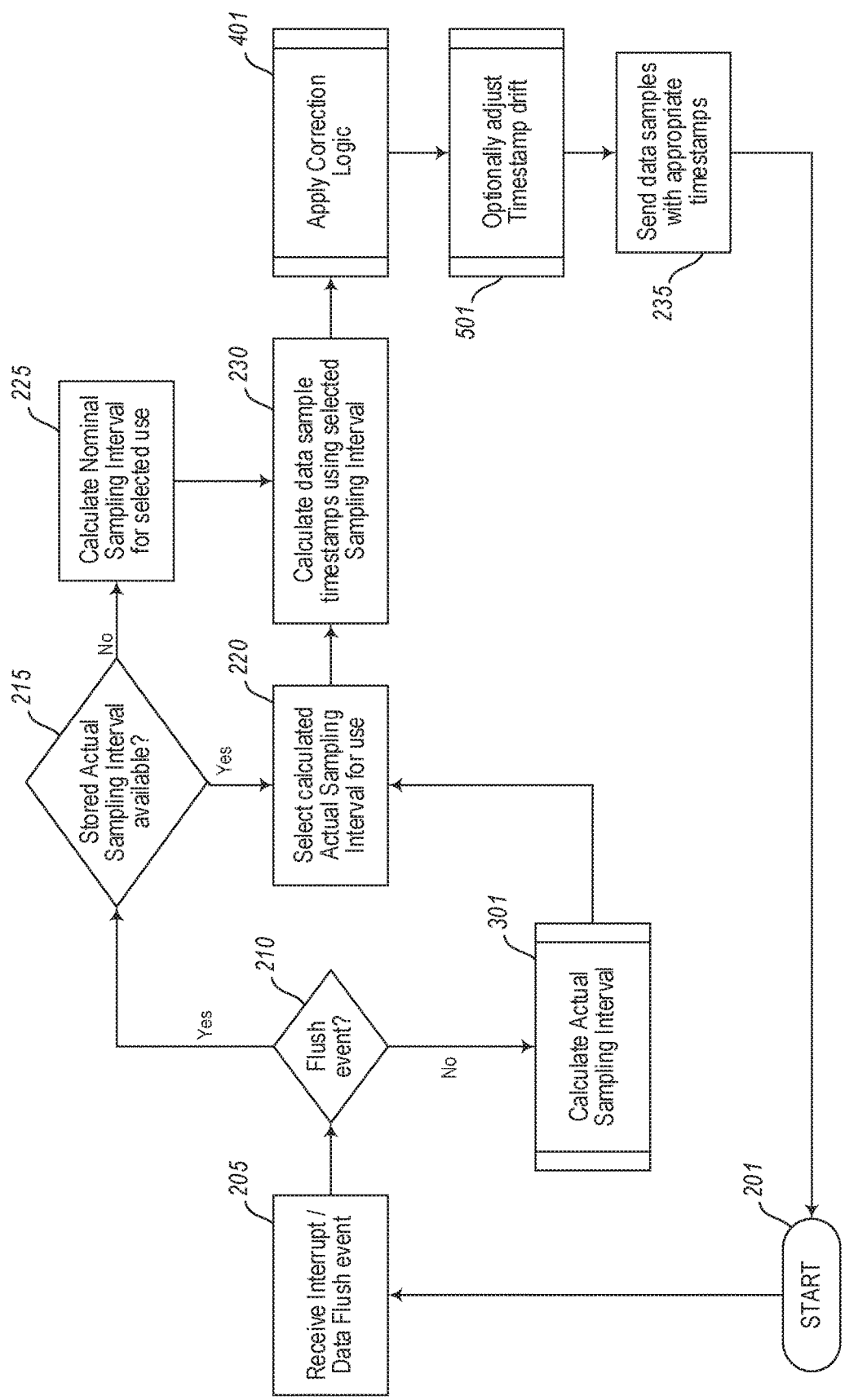
FIG. 2 depicts an operational routine for sensor-based timestamp management in accordance with an exemplary embodiment of techniques described herein.

FIG. 2 depicts an exemplary operational routine 201 for sensor-based timestamp management in accordance with one or more techniques described herein. The routine begins at block 205, in which a processor-based device receives an indication of either a sensor interrupt event or a data flush event associated with a sensor that is either integrated with or otherwise communicatively coupled to the processor-based device. At block 210, the processor-based device determines whether the indicated event is a sensor flush event.

If the indicated event is a sensor flush event, the processor-based device proceeds to block 215, and determines whether an actual sampling interval is available (such as if the actual sampling interval was previously calculated and stored responsive to a prior interrupt event). If so, the processor-based device proceeds to block 220 and selects the available actual sampling interval for use in calculating a timestamp; if not, the processor-based device proceeds to block 225, in which it selects to use the nominal sampling interval for calculating the timestamp.

If in block 210 it was determined that the indicated event was not a data flush event—thereby indicating that the indicated event was instead an interrupt event the processor-based device proceeds to routine 301 in order to calculate an actual sampling interval in response to the detection of that interrupt event. In at least certain embodiments, either as part of or subsequent to such calculation, the calculated actual sampling interval is stored for future use. The processor-based device then proceeds to block 220, in which it selects the newly calculated actual sampling interval for use in calculating a timestamp to be associated with sensor sample data corresponding to the indicated interrupt/flush event.

At block 230, the processor-based device calculates a respective timestamp for the data sample or samples associated with the indicated event based on the selected sampling interval (i.e., the actual sampling interval if possible, or the nominal sampling interval otherwise). The processor-based device then proceeds to routine 401 in order to apply correction logic to the calculated timestamp.

Following the application of correction logic, the processor-based device proceeds to routine 501 to optionally adjust for timestamp drift, such as if a reconfiguration of one or more device parameters or sensor parameters has occurred. The processor-based device of the depicted embodiment then proceeds to block 235, and sends the data sample(s) associated with the indicated event (which in the depicted embodiment includes the appropriate assigned timestamps based on the selected sampling interval and applied correction logic) to the relevant one or more components, modules, or applications that have requested to be provided with data from the indicated sensor.

Following the sending of the timestamped data sample(s) in block 235, the processor-based device returns to starting block 201 to await another interrupt event or data flush event.

Figure 3:
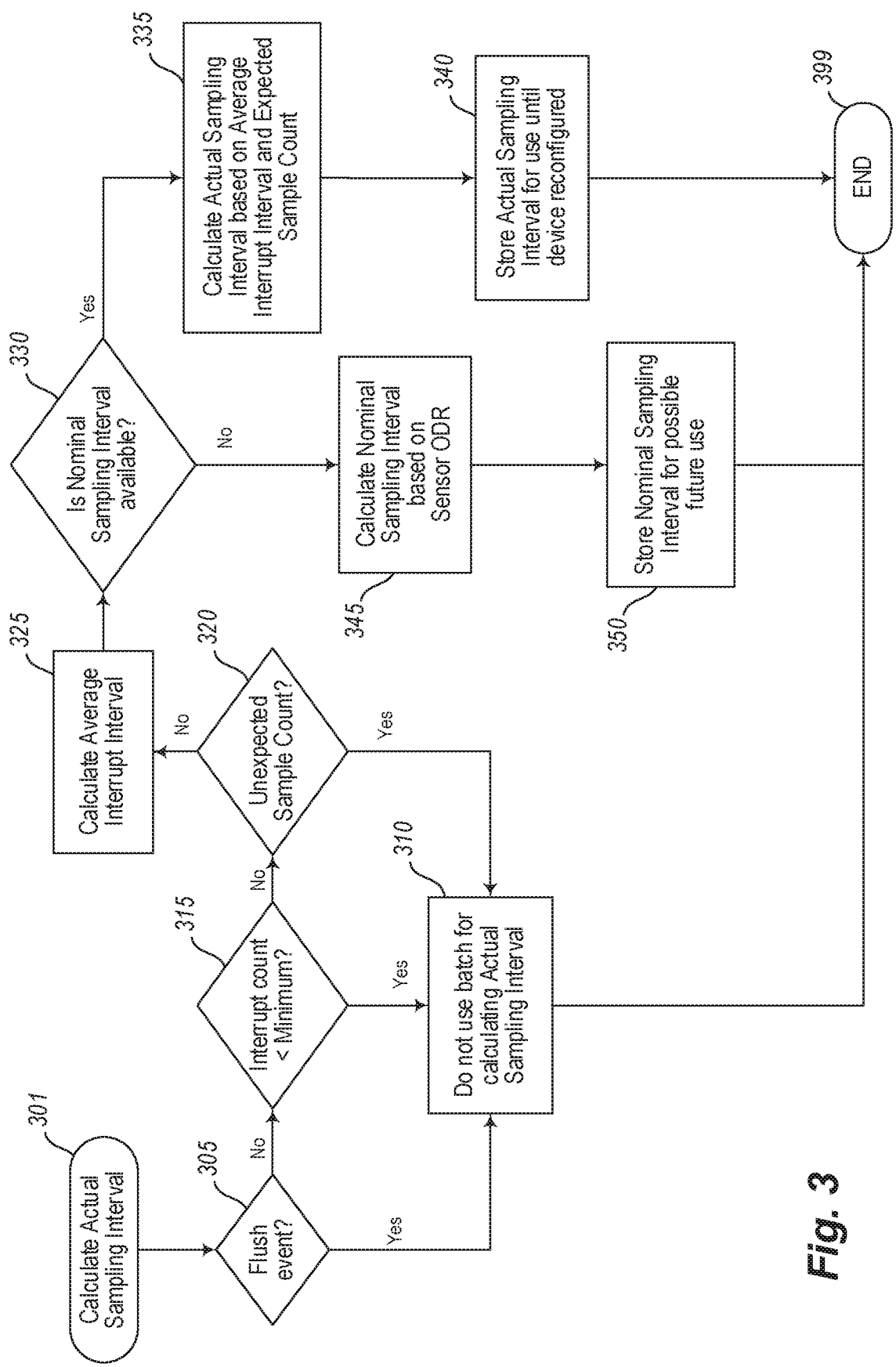
FIG. 3 depicts an exemplary operational routine for calculating a reliable sampling interval for use with respect to sensor-based timestamp management in accordance with one or more embodiments of techniques described herein.

FIG. 3 depicts an exemplary operational routine 301 for calculating an actual sampling interval for use in sensor-based timestamp management. The routine begins at block 305, in which a processor-based device determines, in a manner similar to that in block 210 of FIG. 2, whether an indicated event is a data flush event or an interrupt event. In this depicted embodiment, the determination of the indicated event type is preserved as illustrative; however, it will be appreciated that in certain embodiments such determination may be unnecessary, such as if the event type has been determined via one or more additional or complementary routines (e.g., the exemplary operational routine 201 of FIG. 2).

If the processor-based device determines in block 305 that the indicated event is a data flush event rather than an interrupt event, it proceeds to block 310 and determines not to use the corresponding sample batch associated with the data flush event for calculating the actual sampling interval. (As discussed elsewhere herein, such a data flush event is typically initiated before a required or expected quantity of sample data is available from a sensor, and therefore the reliability of any sampling interval based on sample data accompanying the data flush event may be considered unreliable.)

If in block 305 it is determined that the indicated event is not a data flush event (and therefore that the indicated event is instead an interrupt event) the processor-based device proceeds to block 315 to determine whether the current interrupt count—a count of such interrupt events occurring since device or sensor initialization—is less than a defined threshold quantity associated with the corresponding sensor. For example, in certain embodiments and scenarios, the defined threshold quantity may be selected based on the particular sensor or connected microcontroller, such as to avoid initialization issues during a first few interrupt events while the sensor or microcontroller settles into stable operations. If the processor-based device determines that the current interrupt count is less than the defined threshold quantity, it proceeds to block 310 and determines not to use the corresponding sample batch associated with the indicated interrupt event for calculating the actual sampling interval. Otherwise, it proceeds to block 320.

At block 320, the processor-based device determines whether the quantity of data samples in the sample batch associated with the interrupt event is an unexpected quantity. In certain embodiments, the expected quantity may be based on configuration settings associated with the corresponding sensor, one or more configuration settings associated with an application handling such sensor data, or other configuration settings. As one example, if sensor configuration settings indicate an ODR of 10 samples/second and that an interrupt event is scheduled to occur every 1 second, the expected quantity of samples in each batch associated with interrupt event is 10. As another alternative example, sensor configuration settings may indicate to provide a batch of 16 data samples via an interrupt event regardless of the time interval between such interrupt events. If the processor-based device determines that the received data sample count is other than the expected quantity, it proceeds to block 310 and determines not to use the corresponding sample batch associated with the indicated interrupt event for calculating the actual sampling interval. Otherwise, it proceeds to block 325.

At block 325, the processor-based device calculates the duration of an average interval between interrupt events (the "average interrupt interval"). It will be appreciated that in the depicted embodiment, due to the potentially disqualifying verification operations respectively provided via block 305, block 315, and block 320, the average interrupt interval is calculated using data sample batches only associated with an interrupt event after the system has settled into stability, and only including an expected quantity of data samples. It will be appreciated that in various embodiments, an average interrupt interval may be calculated based on data sample batches that do not necessarily meet some or all such criteria. In certain embodiments, the average interrupt interval may be calculated using an exponential moving average. In various other embodiments, any type of statistical averaging may be utilized (e.g., standard averaging), although such calculations may be less memory efficient (due, for example, to a commensurate need to store additional interval data) than those employing an exponential moving average.

Once the average interrupt interval is calculated, the processor-based device proceeds to block 330, in which it determines whether a nominal sampling interval has been calculated.

If a nominal sampling interval has been calculated, the processor-based device proceeds to block 335, in which it calculates the average sampling interval based on the average interrupt interval calculated in block 325 and on the quantity of data samples (e.g., the expected quantity of data samples verified in block 320). For example, if the average interrupt interval calculated in block 325 is equal to 1.1 seconds, and the quantity of data samples is equal to 10, in the depicted embodiment the actual sampling interval may be calculated as 1.1/10=0.11 seconds. The processor-based device then proceeds to block 340, and stores the calculated average sampling interval for use until the sensor device is reconfigured (for example, until the sensor device is reinitialized or receives modified configuration parameters).

If, alternatively, it is determined in block 330 that a nominal sampling interval has not yet been calculated, the processor-based device proceeds to block 345 and calculates the nominal sampling interval, such as based on the average interrupt interval calculated in block 325 and the nominal ODR associated with the relevant sensor. Following block 345, the processor-based device proceeds to block 350, and stores the nominal sampling interval for use until a reliable nominal sampling interval can be calculated.

Following any of blocks 310, 340, or 350, the processor-based device proceeds to block 399 and ends, such as to return processing of the processor-based device to one or more additional or complementary routines (e.g., the exemplary operational routine 201 of FIG. 2).

Figure 4:
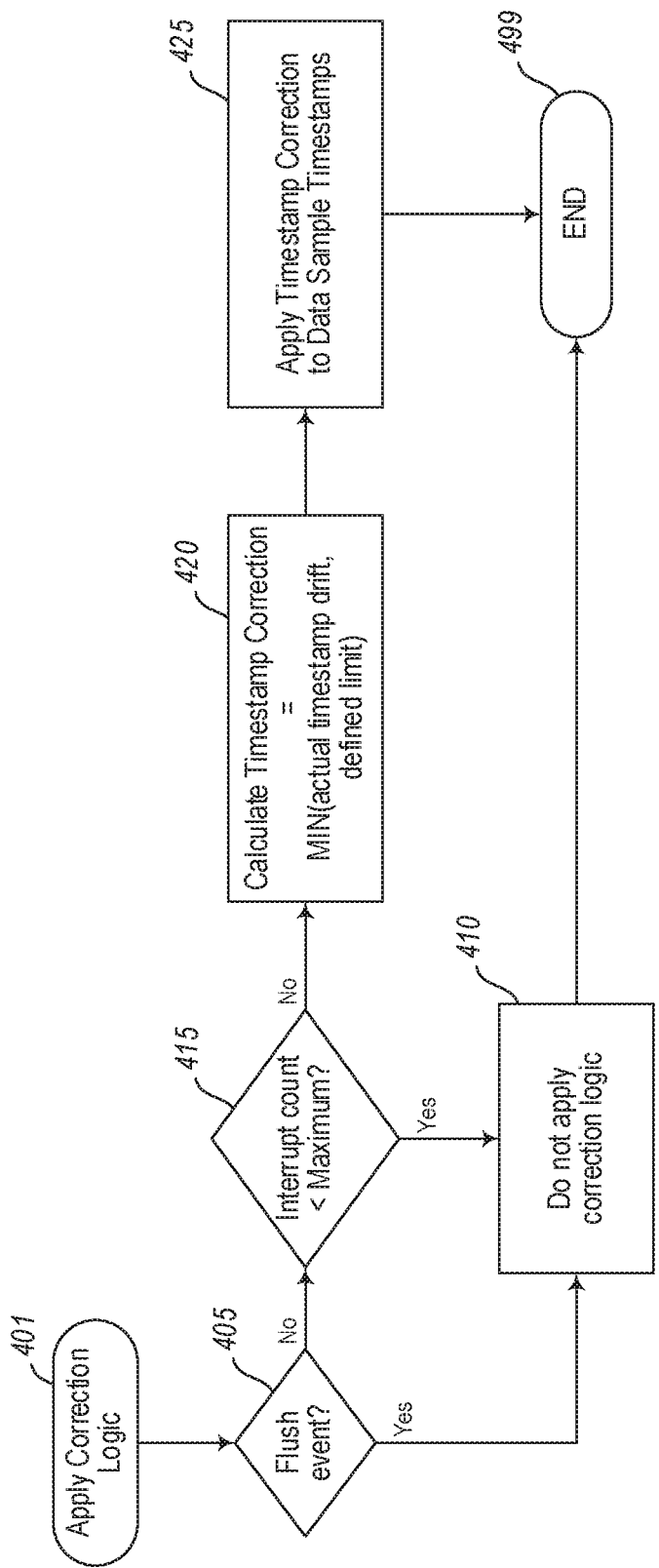
FIG. 4 depicts an exemplary operational routine for the application of correction logic for use in sensor-based timestamp management in accordance with one or more embodiments of techniques described herein.

FIG. 4 depicts an exemplary operational routine 401 for application of correction logic to sensor-based timestamps, such as may follow an initial calculation of data sample timestamps using a selected sampling interval (e.g., block 230 of FIG. 2). The routine begins at block 405, in which a processor-based device determines whether an indicated event is a data flush event or an interrupt event.

If the processor-based device determines in block 405 that the indicated event is a data flush event rather than an interrupt event, it proceeds to block 410 and determines not to apply any correction logic to the initial calculation of data sample timestamps. After block 410, the processor-based device proceeds to block 499 and ends, such as to return processing of the processor-based device to one or more additional or complementary routines (e.g., the exemplary operational routine 201 of FIG. 2).

If in block 405 it is determined that the indicated event is not a data flush event (and therefore that the indicated event is instead an interrupt event) the processor-based device proceeds to block 415 to determine whether the current interrupt count—a count of such interrupt events occurring since device or sensor initialization—is less than a defined threshold quantity associated with the corresponding sensor. As noted elsewhere herein, in certain embodiments and scenarios the defined threshold quantity may be selected based on the particular sensor or connected microcontroller, such as to avoid initialization or reconfiguration issues while the sensor or microcontroller settles into stable operations. If the processor-based device determines that the current interrupt count is less than the defined threshold quantity, it proceeds to block 410 and determines not to apply correction logic to the corresponding sample batch associated with the indicated interrupt event, then to block 499 and ends, such as to return processing of the processor-based device to one or more additional or complementary routines. Otherwise, it proceeds to block 420.

At block 420, the processor-based device calculates a timestamp correction with respect to each data sample in the sample batch associated with the relevant (e.g., most recent) interrupt event, such as in order to reduce any timestamp latency and improve timestamp accuracy, as well as to avoid the introduction of additional jitter. In the depicted embodiment, a timestamp associated with each such data sample may be corrected in accordance with the lesser of two quantities: the actual timestamp drift (which, as one non-limiting example, may be determined as the difference between the timestamp associated with the last data sample in the batch and the interrupt event time); and a defined limit for such modification. While various defined limits may be utilized, in certain embodiments the defined limit for such correction may be selected as a defined portion, such as two percent (2%), of the calculated sampling interval. Thus, if the actual timestamp drift is greater than 2% of the sampling interval, the processor-based device may calculate the timestamp correction as 2% of the sampling interval. If, alternatively, the actual timestamp drift is less than 2% of the sampling interval, the processor-based device may calculate the timestamp correction as being equal to that actual timestamp drift—thereby indicating to align the data sample timestamp and the interrupt event timestamp. Following the calculation of the timestamp correction, the processor-based device proceeds to block 425.

At block 425, the processor-based device applies the calculated timestamp correction to each timestamp associated with a data sample batch provided in response to the relevant interrupt event, such as by modifying the respective timestamp to reflect the calculated correction determined in block 420. In certain embodiments, applying the calculated timestamp correction may include calculating a respective timestamp for each of those multiple data samples, such as based on the calculated timestamp correction and on the sampling interval (calculated or nominal) associated with the relevant sensor.

Following block 425, the processor-based device proceeds to block 499 and ends, such as to return processing of the processor-based device to one or more additional or complementary routines (e.g., the exemplary operational routine 201 of FIG. 2).

Figure 5:
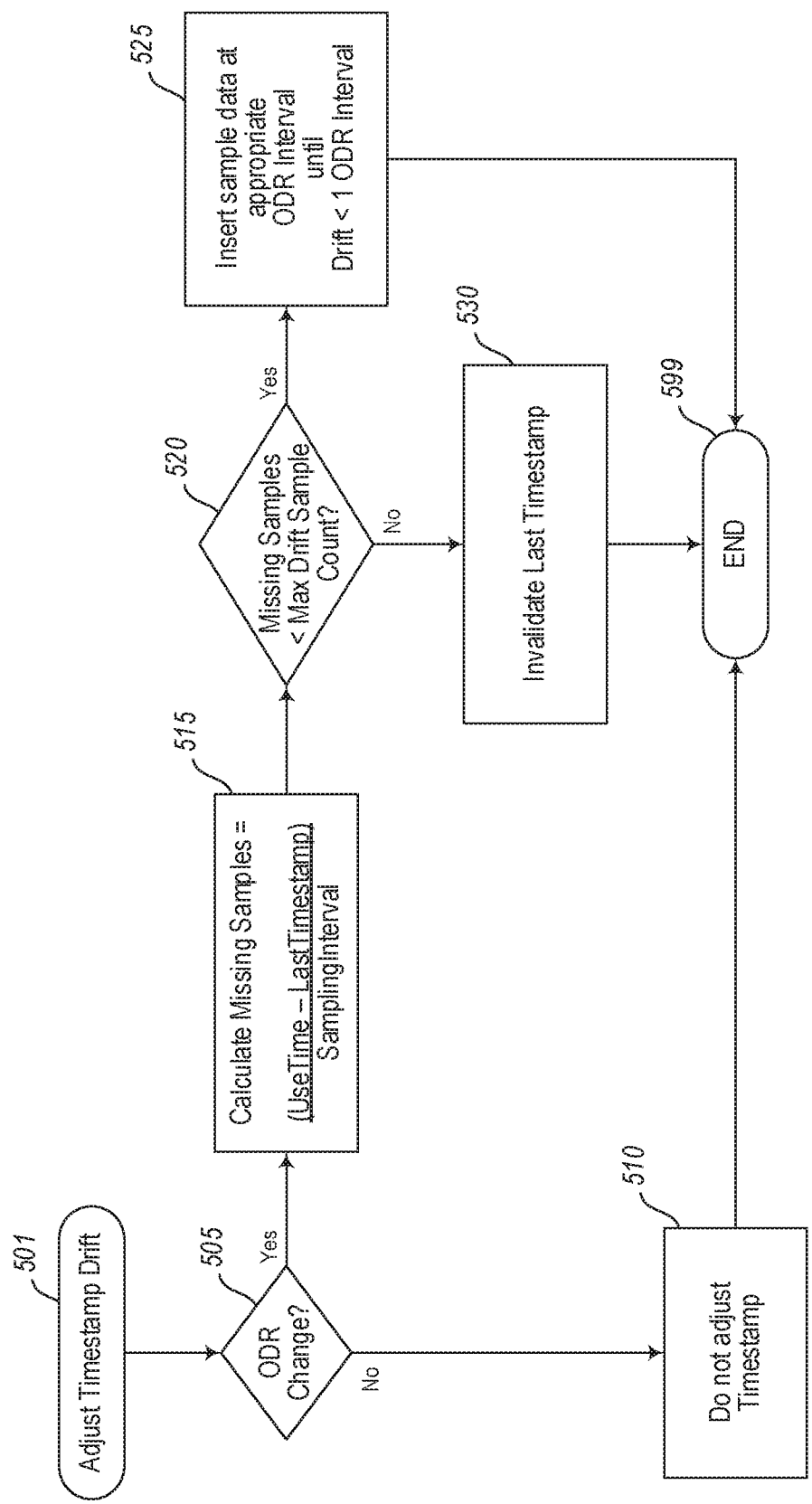
FIG. 5 depicts an exemplary operational routine for decreasing timestamp drift for use with respect to sensor-based timestamp management in accordance with one or more embodiments of techniques described herein.

FIG. 5 depicts an exemplary operational routine 501 for adjusting timestamp drift for sensor-based timestamps, such as in the event of a reconfiguration of one or more device parameters or sensor parameters. In such scenarios, there is a likelihood of a change to the output data rate ("ODR") for the relevant sensor, as well as a corresponding gap between timestamps associated with two consecutive data samples. Such a gap may result in increased jitter or latency, depending on how a processor-based device handles any resultant missing data samples. In the depicted embodiment, the resulting timestamp drift may be adjusted by creating new or interpolated data samples in order to align data samples of an event-associated data sample batch with a sampling interval appropriate for the modified output data rate.

As an example, assume that the sensor ODR is currently 1 Hz, such that the sensor is providing one data sample per second. Now assume that 900 ms after an interrupt event, the sensor is reconfigured to provide an ODR of 10 Hz, such that the sensor is to provide 10 data samples per second. This reconfiguration results in at least a 900 ms "gap" between data samples, effectively causing significant jitter. In certain scenarios, this gap may be exacerbated by a settling time in which the sensor or processor-based device is initialized to accommodate the modified ODR. By inserting data samples at an interval in accordance with the modified ODR, the resultant gap is eliminated, thereby lessening or eliminating the associated jitter. In certain embodiments, the inserted data samples may be generated by repetition of the most recent timestamped data sample. Alternatively, the inserted data samples may be generated by one or more interpolation techniques. In either case, the timestamp gap otherwise caused by modification to the sensor ODR and the commensurate jitter is avoided. In addition, a maximum latency associated with such data samples may be limited to a single sampling interval.

The routine 501 begins at block 505, in which a processor-based device determines whether the ODR for the relevant sensor has changed from a previous value associated with that sensor. If not, the processor-based device proceeds to block 510, in which it determines not to adjust any associated timestamps to compensate for the detected modification of the sensor ODR.

If it is determined in block 505 that the ODR for the relevant sensor has changed (such as in response to a reconfiguration of one or more sensor parameters or device parameters), the processor-based device proceeds to block 515 in order to calculate a quantity of "missing" data samples. In the depicted embodiment, the quantity of missing data samples is determined as follows:

$$SampleQuantity = \frac{(UseTime - LastTimestamp)}{SamplingInterval}$$

where UseTime is either the timestamp associated with the relevant interrupt event or (if the interrupt event is not associated with a timestamp) the current time; where LastTimestamp is the most recent timestamp associated with a data sample in the batch; and where SamplingInterval is the sampling interval (actual or nominal) associated with the new output data rate for the sensor. The processor-based device then proceeds to block 520.

At block 520, the processor-based device determines whether the quantity of missing samples calculated in block 515 is less than a maximum quantity of data samples for insertion into the sample batch associated with the relevant flush/interrupt event. As one example, in one embodiment such a maximum quantity of data samples for such insertion may be selected as a ratio of a maximum sensor output data rate to a minimum sensor output data rate. In that exemplary embodiment, supposing a maximum ODR of 833 data samples per second and a minimum ODR of 26 samples per second, there would be maximum of 32 (833/26) data samples inserted into the corresponding sample batch. If in block 520 it is determined that the quantity of missing samples is less than the maximum such quantity, then the processor-based device proceeds to block 530, and invalidates the most recent timestamp associated with a data sample in the batch.

If in block 520 it is determined that the quantity of missing samples calculated in block 515 meets or exceeds the maximum quantity of data samples for insertion into the sample batch associated with the relevant flush/interrupt event, then the processor-based device proceeds to block 525 and generates data samples for insertion into data being provided by the sensor, such as based on a determined sampling interval for the associated output data rate. In at least the depicted embodiment, the missing data samples are generated and inserted to limit the associated timestamp drift to less than a single sampling interval for that associated ODR.

Following any of blocks 510, 520, and 525, the processor-based device proceeds to block 599 and ends, such as to return processing of the processor-based device to one or more additional or complementary routines (e.g., the exemplary operational routine 201 of FIG. 2).

Figure 6:
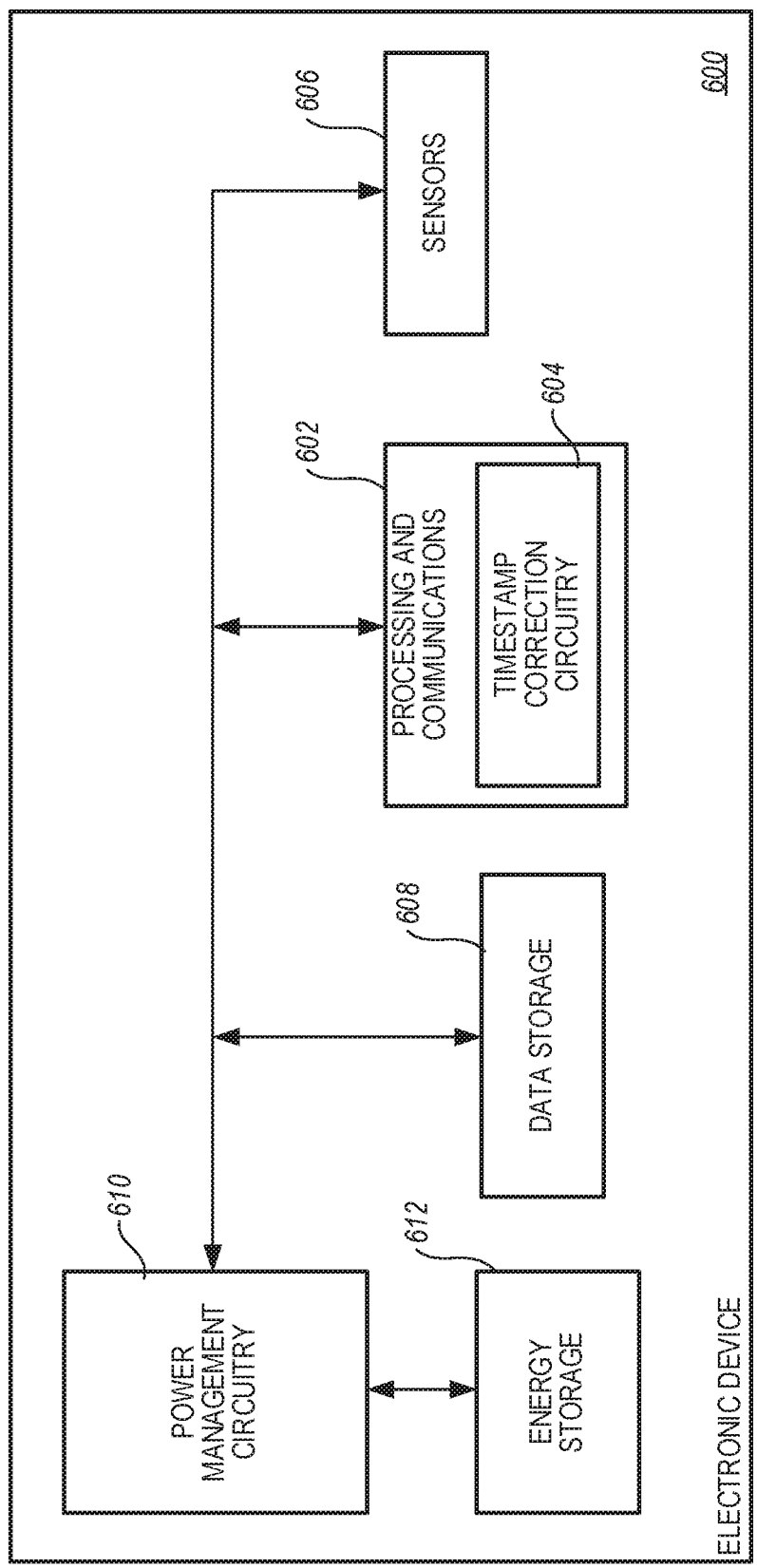
FIG. 6 is a functional block diagram of an embodiment of an electronic device or other system utilizing timestamp management operations in accordance with one or more techniques described herein.

FIG. 6 is a functional block diagram of an electronic device 600, including processing and communications circuitry 602 that includes timestamp correction circuitry 604 in accordance with an embodiment of the present disclosure. The timestamp correction circuitry 604 may correspond, for example, to embodiments of such circuitry configured to perform various operations described with reference to FIGS. 2-5 of the present disclosure. The electronic device 600 includes one or more sensors 606 that generate digital sensor signals, which are provided to the processing and communications circuitry 602 or timestamp correction circuitry 604 for further processing. The timestamp correction circuitry 604 may generate various information and results based on the digital sensor data provided from the sensors 606. As discussed elsewhere herein, such operations may result in the timestamp correction circuitry 604 providing greater accuracy with respect to timestamps associated with sensor data provided from the sensors 606 relative to situations in which the processing and communications circuitry 602 utilizes known or less robust timestamp management operations.

In the depicted embodiment of FIG. 6, the electronic device 600 further includes data storage circuitry 608, such as may be used to temporarily or permanently store data samples received from the sensors 606, as well as other data utilized by the processing and communications circuitry 602 or timestamp correction circuitry 604. Also in the depicted embodiment, the electronic device 600 further includes power management circuitry 610, which controls the storage of power in an energy storage device 612, such as a battery or capacitor, as well as the supplying of power to the processing and communication circuitry 602, timestamp correction circuitry 604, and sensors 606.

In some embodiments, the systems, circuits, and devices described herein may include more components than illustrated, may include fewer components than illustrated, may split illustrated components into separate components, may combine illustrated components, etc., and may include various combinations thereof.

Embodiments of timestamp management methods as described herein may contain additional operations not specifically depicted in FIGS. 2-5, may omit certain operations depicted in such figures, may perform operations depicted in such figures in various orders, and may be modified in various respects, such as by performing various operations in parallel despite such operations being depicted as being performed in series, or vice-versa.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods or functionality may be implemented or provided in other manners, such as at least partially in firmware or hardware, including, but not limited to, one or more application-specific integrated circuits (ASICs), digital signal processors, discrete circuitry, logic gates, standard integrated circuits, controllers (e.g., by executing appropriate instructions, and including microcontrollers or embedded controllers), field-programmable gate arrays (FPGAs), complex programmable logic devices (CPLDs), etc., as well as devices that employ RFID technology, and various combinations thereof.

In an embodiment, a method may comprise receiving an indication of a sensor event associated with one or more data samples provided from a sensor having an output data rate; determining an event type of the indicated event; assigning a respective timestamp to each of the one or more data samples; and providing as output the one or more data samples with the one or more respective timestamps. Assigning the respective timestamp may include, responsive to a determination that the event type is an interrupt event, calculating an actual data sampling interval based at least in part on one or more time intervals between two or more previous sensor events and a on a quantity of the one or more data samples. Assigning the respective timestamp may alternatively include, responsive to a determination that the event type is a data flush event, assigning the respective timestamp based on an actual data sampling interval associated with one or more previous sensor events if the actual data sampling interval has been previously stored, and otherwise assigning the respective timestamp based at least in part on the output data rate.

Assigning the respective timestamp based at least in part on the output data rate may include calculating a nominal sampling interval based on the output data rate.

The method may further comprise determining whether a quantity of interrupt events that have occurred since the sensor has been initialized is less than a threshold; and determining, responsive to determining that the quantity is less than the threshold, to disregard the one or more data samples for purposes of calculating the actual data sampling interval, and otherwise calculating the actual data sampling interval associated with the one or more data samples.

The method may further comprise, responsive to the determination that the event type is an interrupt event, determining whether a quantity of the one or more data samples is an expected quantity for an interrupt event; and determining, responsive to determining that the quantity of the one or more data samples is not the expected quantity, to disregard the one or more data samples for purposes of calculating the actual data sampling interval.

The method may further comprise, responsive to the determination that the event type is an interrupt event, calculating the average interrupt interval.

The method may further comprise, responsive to identifying a difference between a timestamp associated with the indicated event and a timestamp associated with a most recent data sample of the one or more data samples, modifying the timestamp associated with the most recent data sample. Modifying the timestamp associated with the most recent one data sample may include, responsive to determining that the difference is less than a defined portion of a selected sampling interval, modifying the timestamp associated with the most recent data sample to match the timestamp associated with the indicated event; or, responsive to determining that the difference meets or exceeds the defined portion, modifying the timestamp associated with the most recent data sample by the defined portion.

In an embodiment, a system may comprise processing circuitry, a sensor communicatively coupled to the processing circuitry to provide sensor data, and timestamp correction circuitry communicatively coupled to the processing circuitry to perform automated operations for managing timestamp information regarding the sensor data. The automated operations may include to receive an indication of a sensor event associated with one or more data samples provided from the sensor; to assign a respective timestamp to each of the one or more data samples; and to output the one or more data samples with the one or more respective timestamps. To assign the respective timestamp may include, responsive to a determination that the indicated event is an interrupt event, calculate an actual data sampling interval based at least in part on one or more time intervals between two or more previous sensor events and a on a quantity of the one or more data samples; or, responsive to a determination that the indicated event is a data flush event, to assign the respective timestamp based on an actual data sampling interval associated with one or more previous sensor events if the actual data sampling interval has been previously stored, and otherwise to assign the respective timestamp based at least in part on an output data rate associated with the sensor.

To assign the respective timestamp based at least in part on the output data rate may include to calculate a nominal sampling interval based on the output data rate.

The automated operations may further include to determine whether a quantity of interrupt events that have occurred since the sensor has been initialized is less than a threshold; and to determine, responsive to a determination that the quantity is less than the threshold, to disregard the one or more data samples for purposes of calculating the actual data sampling interval, and otherwise calculate the actual data sampling interval associated with the one or more data samples.

The automated operations may further include to determine, responsive to the determination that the indicated event is an interrupt event, whether a quantity of the one or more data samples is an expected quantity for the interrupt event; and to determine, in response to a determination that the quantity of the one or more data samples is not the expected quantity, to disregard the one or more data samples for purposes of calculating the actual data sampling interval.

The automated operations may further include to calculate, responsive to the determination that the indicated event is an interrupt event, the average interrupt interval.

The automated operations may further include to modify, responsive to detection of a difference between a timestamp associated with the indicated event and a timestamp associated with a most recent data sample of the one or more data samples, the timestamp associated with the most recent data sample. To modify the timestamp associated with the most recent data sample may include to modify, responsive to a determination that the difference is less than a defined portion of a selected sampling interval, the timestamp associated with the most recent data sample to match the timestamp associated with the indicated event; or, responsive to a determination that the difference meets or exceeds the defined portion, to modify the timestamp associated with the most recent data sample by an amount of time equal to the defined portion.

In an embodiment, a non-transitory computer-readable medium may have stored instructions thereon that, when executed by one or more processors, cause the one or more processors to perform one or more automated operations. The automated operations may comprise receiving an indication of a sensor event associated with one or more data samples provided from a sensor having an output data rate; assigning a respective timestamp to each of the one or more data samples; and providing the one or more data samples with the one or more respective timestamps. The assigning of the respective timestamp may include, responsive to a determination that the indicated event is an interrupt event, calculating an actual data sampling interval based at least in part on one or more time intervals between two or more previous sensor events and a on a quantity of the one or more data samples; or, responsive to a determination that the indicated event is a data flush event, assigning the respective timestamp based on an actual data sampling interval associated with one or more previous sensor events if the actual data sampling interval has been previously stored, and otherwise assigning the respective timestamp based at least in part on the output data rate.

Assigning the respective timestamp based at least in part on the output data rate may include calculating a nominal sampling interval based on the output data rate.

The automated operations may further comprise determining whether a quantity of interrupt events that have occurred since the sensor has been initialized is less than a threshold; and determining to disregard the one or more data samples for purposes of calculating the actual data sampling interval responsive to the quantity being less than the threshold, and otherwise calculating the actual data sampling interval associated with the one or more data samples.

The automated operations may further comprise determining, responsive to the determination that the event type is an interrupt event, whether a quantity of the one or more data samples is an expected quantity for an interrupt event; and determining, responsive to determining that the quantity of the one or more data samples is not the expected quantity, to disregard the one or more data samples for purposes of calculating the actual data sampling interval.

The automated operations may further comprise calculating, responsive to the determination that the event type is an interrupt event, the average interrupt interval.

The automated operations may further comprise modifying, responsive to identifying a difference between a timestamp associated with the indicated event and a timestamp associated with a most recent data sample of the one or more data samples, the timestamp associated with the most recent data sample. Modifying the timestamp associated with the most recent data sample may include modifying, responsive to determining that the difference is less than a portion of a selected sampling interval, the timestamp associated with the most recent data sample to match the timestamp associated with the indicated event; or, responsive to determining that the difference meets or exceeds the portion, modifying the timestamp associated with the most recent data sample by the portion.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
   receiving an indication of a sensor event associated with one or more data samples provided from a sensor having an output data rate;
   determining that an event type of the indicated event is either an interrupt event or a data flush event, wherein the interrupt event is an indication from the sensor that a required or expected quantity of sensor data is available, and wherein the data flush event is a request for sensor data received prior to the sensor data being available via the interrupt event;
   assigning a respective timestamp to each of the one or more data samples, the assigning of the respective timestamp including:
      responsive to a determination that the event type is an interrupt event, calculating an actual data sampling interval based at least in part on one or more time intervals between two or more previous sensor events and on a quantity of the one or more data samples, and assigning a first respective timestamp based on the calculated actual data sampling interval; and
      responsive to a determination that the event type is a data flush event, assigning a second respective timestamp based on an actual data sampling interval associated with one or more previous sensor events if the actual data sampling interval has been previously stored, and otherwise assigning the second respective timestamp based at least in part on the output data rate; and
   providing as output the one or more data samples with the one or more respective timestamps.

2. The method of claim 1 wherein assigning the second respective timestamp based at least in part on the output data rate includes calculating a nominal sampling interval based on the output data rate.

3. The method of claim 1, further comprising:
   determining whether a quantity of interrupt events that have occurred since the sensor has been initialized is less than a threshold; and
   determining, responsive to determining that the quantity is less than the threshold, to disregard the one or more data samples for purposes of calculating the actual data sampling interval, and otherwise calculating the actual data sampling interval associated with the one or more data samples.

4. The method of claim 1, further comprising:
   responsive to the determination that the event type is an interrupt event, determining whether a quantity of the one or more data samples is an expected quantity for an interrupt event; and
   determining, responsive to determining that the quantity of the one or more data samples is not the expected quantity, to disregard the one or more data samples for purposes of calculating the actual data sampling interval.

5. The method of claim 1 further comprising, responsive to the determination that the event type is an interrupt event, calculating an average interrupt interval.

6. The method of claim 1 further comprising, responsive to identifying a difference between a timestamp associated with the indicated event and a timestamp associated with a most recent data sample of the one or more data samples, modifying the timestamp associated with the most recent data sample.

7. The method of claim 6, wherein modifying the timestamp associated with the most recent one data sample includes:
   responsive to determining that the difference is less than a portion of a selected sampling interval, modifying the timestamp associated with the most recent data sample to match the timestamp associated with the indicated event; or
   responsive to determining that the difference meets or exceeds the portion, modifying the timestamp associated with the most recent data sample by the portion.

8. A system, comprising:
   processing circuitry;
   a sensor communicatively coupled to the processing circuitry to provide sensor data; and
   timestamp correction circuitry communicatively coupled to the processing circuitry to perform automated operations for managing timestamp information regarding the sensor data, wherein the automated operations include to:
      receive an indication of a sensor event associated with one or more data samples provided from the sensor;
      determine that an event type of the indicated event is either an interrupt event or a data flush event, wherein the interrupt event is an indication from the sensor that a required or expected quantity of senor data is available, and wherein the data flush event is a request for sensor data received prior to the sensor data being available via the interrupt event;
      assign a respective timestamp to each of the one or more data samples, wherein to assign the respective timestamp includes:
         responsive to a determination that the indicated event is an interrupt event, calculate an actual data sampling interval based at least in part on one or more time intervals between two or more previous sensor events and on a quantity of the one or more data samples, and assigning a first respective timestamp based on the calculated actual data sampling interval; and responsive to a determination that the indicated event is a data flush event, assign a second respective timestamp based on an actual data sampling interval associated with one or more previous sensor events if the actual data sampling interval has been previously stored, and otherwise assign the second respective timestamp based at least in part on an output data rate associated with the sensor; and output the one or more data samples with the one or more respective timestamps.

9. The system of claim 8 wherein to assign the second respective timestamp based at least in part on the output data rate includes to calculate a nominal sampling interval based on the output data rate.

10. The system of claim 8, wherein the automated operations further include to:

determine whether a quantity of interrupt events that have occurred since the sensor has been initialized is less than a threshold; and determine, responsive to a determination that the quantity is less than the threshold, to disregard the one or more data samples for purposes of calculating the actual data sampling interval, and otherwise calculate the actual data sampling interval associated with the one or more data samples.

11. The system of claim 8, wherein the automated operations further include to:

determine, responsive to the determination that the indicated event is an interrupt event, whether a quantity of the one or more data samples is an expected quantity for the interrupt event; and determine, in response to a determination that the quantity of the one or more data samples is not the expected quantity, to disregard the one or more data samples for purposes of calculating the actual data sampling interval.

12. The system of claim 8, wherein the automated operations further include to calculate, responsive to the determination that the indicated event is an interrupt event, an average interrupt interval.

13. The system of claim 8, wherein the automated operations further include to modify, responsive to detection of a difference between a timestamp associated with the indicated event and a timestamp associated with a most recent data sample of the one or more data samples, the timestamp associated with the most recent data sample.

14. The system of claim 13, wherein to modify the timestamp associated with the most recent data sample includes to:

responsive to a determination that the difference is less than a portion of a selected sampling interval, modify the timestamp associated with the most recent data sample to match the timestamp associated with the indicated event; or responsive to a determination that the difference meets or exceeds the portion, modify the timestamp associated with the most recent data sample by an amount of time equal to the portion.

15. A non-transitory computer-readable medium having stored instructions thereon that, when executed by one or more processors, cause the one or more processors to perform one or more automated operations, the automated operations comprising:

receiving an indication of a sensor event associated with one or more data samples provided from a sensor having an output data rate;

determining that an event type of the indicated event is either an interrupt event or a data flush event, wherein the interrupt event is an indication from the sensor that a required or expected quantity of sensor data is available, and wherein the data flush event is a request for sensor data received prior to the sensor data being available via the interrupt event;

assigning a respective timestamp to each of the one or more data samples, the assigning of the respective timestamp including:

responsive to a determination that the indicated event is an interrupt event, calculating an actual data sampling interval based at least in part on one or more time intervals between two or more previous sensor events and on a quantity of the one or more data samples, and assigning a first respective timestamp based on the calculated actual data sampling interval; and responsive to a determination that the indicated event is a data flush event, assigning a second respective timestamp based on an actual data sampling interval associated with one or more previous sensor events if the actual data sampling interval has been previously stored, and otherwise assigning the second respective timestamp based at least in part on the output data rate; and providing the one or more data samples with the one or more respective timestamps.

16. The non-transitory computer-readable medium of claim 15 wherein assigning the second respective timestamp based at least in part on the output data rate includes calculating a nominal sampling interval based on the output data rate.

17. The non-transitory computer-readable medium of claim 15, wherein the automated operations further comprise:

determining whether a quantity of interrupt events that have occurred since the sensor has been initialized is less than a threshold; and determining to disregard the one or more data samples for purposes of calculating the actual data sampling interval responsive to the quantity being less than the threshold, and otherwise calculating the actual data sampling interval associated with the one or more data samples.

18. The non-transitory computer-readable medium of claim 15, wherein the automated operations further comprise:

responsive to the determination that the event type is an interrupt event, determining whether a quantity of the one or more data samples is an expected quantity for an interrupt event; and determining, responsive to determining that the quantity of the one or more data samples is not the expected quantity, to disregard the one or more data samples for purposes of calculating the actual data sampling interval.

19. The non-transitory computer-readable medium of claim 15, wherein the automated operations further comprise calculating, responsive to the determination that the event type is an interrupt event, an average interrupt interval.

20. The non-transitory computer-readable medium of claim 15, wherein the automated operations further comprise modifying, responsive to identifying a difference between a timestamp associated with the indicated event and a timestamp associated with a most recent data sample of the one or more data samples, the timestamp associated with the most recent data sample.

21. The non-transitory computer-readable medium of claim 20, wherein modifying the timestamp associated with the most recent data sample includes:
   responsive to determining that the difference is less than a portion of a selected sampling interval, modifying the timestamp associated with the most recent data sample to match the timestamp associated with the indicated event; or
   responsive to determining that the difference meets or exceeds the portion, modifying the timestamp associated with the most recent data sample by the portion.

* * * * *

UNITED STATES PATENT AND TRADEMARK OFFICE
CERTIFICATE OF CORRECTION

Page 1 of 1

PATENT NO. : 11,025,357 B1
APPLICATION NO. : 16/721331
DATED : June 1, 2021
INVENTOR(S) : Sayed et al.

It is certified that error appears in the above-identified patent and that said Letters Patent is hereby corrected as shown below:

On the Title Page

<u>(57) ABSTRACT, Line 10:</u>
"sensor events and a on" should read, --sensor events and on--.

In the Claims

<u>Column 16, Line 56, Claim 8:</u>
"senor" should read, --sensor--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*